June 4, 1929.  J. WEBER ET AL  1,715,968
MACHINE FOR FILLING BAKING PANS
Filed Feb. 17, 1927  2 Sheets-Sheet 1
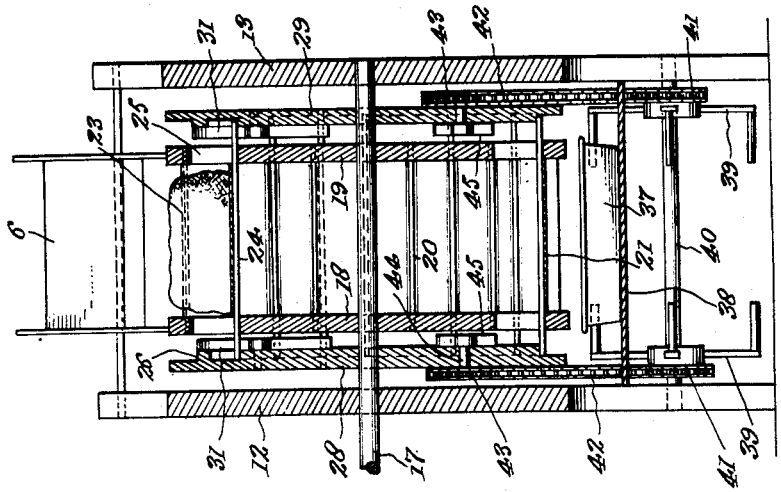
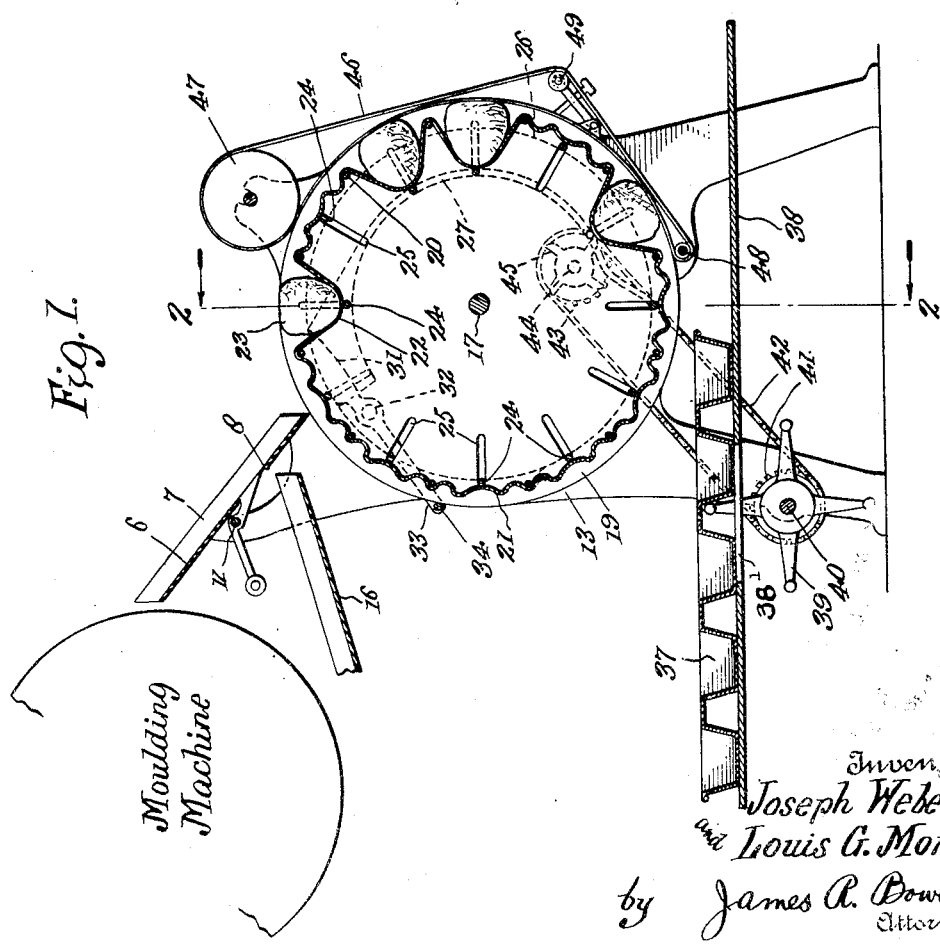
Inventors
Joseph Weber
and Louis G. Morien
by James R. Bowen
Attorney.

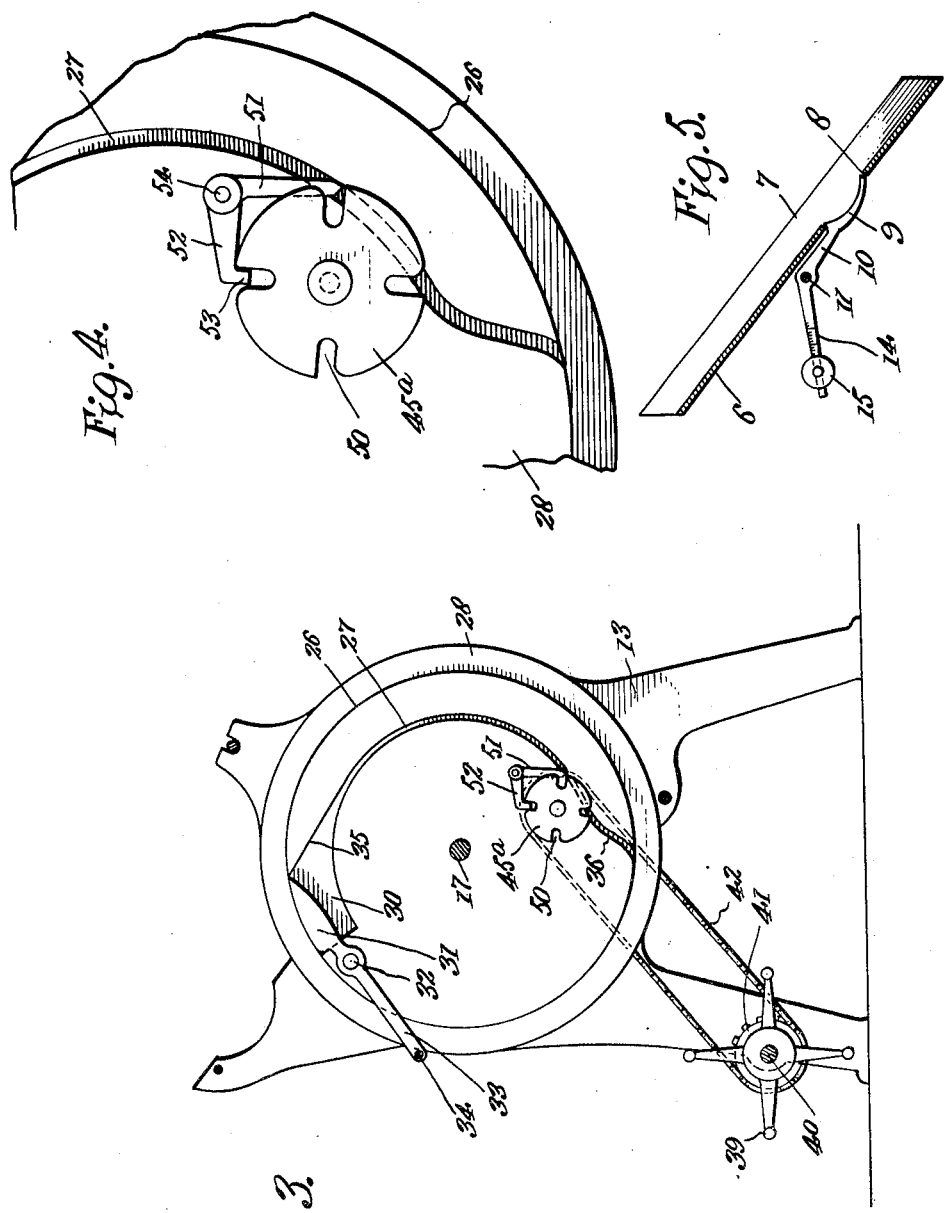

Patented June 4, 1929.

1,715,968

UNITED STATES PATENT OFFICE.

JOSEPH WEBER AND LOUIS G. MORTEN, OF JERSEY CITY, NEW JERSEY.

MACHINE FOR FILLING BAKING PANS.

Application filed February 17, 1927. Serial No. 168,902.

The present invention relates to machines for filling baking pans, and has for an object to provide a machine adapted to receive dough from a moulding machine and to transmit such dough to baking pans, the pans being then transferred to raising ovens.

In the mechanical accomplishment of the above purposes considerable difficulty has been heretofore experienced in that the pan advancing mechanism has been actuated periodically whether the dough batch was deposited therein or not and vacant pans were advanced toward the raising oven, which vacant pans were required to be filled by hand.

It is another object of the present invention to provide a coordinate agency which will control pan advancing mechanism to move in sequence with dough delivery to pans, provision being made for suspending the movement of the pan actuating mechanism when there is a lack of dough for the next pan in line, such movement of pans being restrained until a dough batch is actually deposited in the pan.

A further object of the invention is to provide a machine involving compact construction of a receiving drum wherein dough batches will be held in sanitary pockets.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is a vertical section taken through a pan filling machine constructed in accordance with the present invention;

Figure 2 is a vertical section taken transversely on the line 2—2 in Figure 1;

Figure 3 is a side view, with parts shown in section, of a machine incorporating a slight modification;

Figure 4 is an enlarged fragmentary side view of the machine shown in Figure 3; and Figure 5 is an enlarged sectional view through the delivery chute.

Referring more particularly to the drawings, an inclined chute 6 is shown as positioned to receive batches of dough from a moulding machine which is appropriately designated in Figure 1. The chute illustrated in Figure 5 is shown as having side flanges 7 and an opening 8 in its base normally closed by a trap door, as 9, whereby batches of dough will pass to the receiving drum hereinafter referred to. The trap door 9 is shown as carried upon an arm 10 pivoted as shown at 11 to the side frames 12 and 13 of the machine. These side frames also serve to support the chute 16. The arm 10 is shown as provided with a tail piece 14 upon which there is shown adjustably mounted a counter weight 15 designed and positioned to normally cause closing of the trap door 9. The weight 15, however, is so selected that in case of over-weight in dough batches, such dough batches may force the trap door 9 downwardly and permit of the escape of the over-weight dough batches, known in the trade as "doubles". A supplementary chute 16 is shown as extending on an intersecting diagonal angle with the chute 6 and as disposed with its receiving end below the trap door.

A rotary drum is shown as mounted on a shaft 17, journaled in the side frames 12 and 13. This shaft 17 may be driven from an appropriate source of power. The drum may be built up in any appropriate manner, preferably as shown, in which a pair of spaced discs 18 and 19 are shown as fixed to the shaft 17 and connected by rods 20, which rods are shown as receiving thereabout a flexible tape or web 21 of canvas or other appropriate material of a length greater than the circumference of the drum, whereby such web may be depressed to form pockets 22 for receiving dough batches 23 from the chute 6. The pockets 22 are shown as formed between adjacent rods 20 and midway between such fixed rods 20 are shown slidable ejecting rods 24 fitted to slide in radial slots 25 in the discs 18 and 19. The ends of the ejecting rods 24 are adapted to travel upon either an external track or runway, as 26, or upon an internal track or runway, as 27; such tracks being shown as provided upon stationary side plates 28 and 29 fitted between the drum discs and the side frames. These tracks or runways are shown concentric (see Figure 3). Just below the chute 6 cavities 30 are shown in the side plates 28 and 29. These cavities create gaps in the outer track 26. These gaps may be normally bridged by bridging pieces 31 shown as made in the form of levers pivoted as indicated at 32 to the side plates 28 and 29. These bridging pieces are shown as disposed alongside the track portions of the side plates. The levers are shown as provided with tail pieces 33, weighted to hold the levers in the position illustrated in Figure 3. The tail pieces are shown as provided with connecting rods 34 to which engage the peripheral portions of the side plates and restrict the further movement of the bridging pieces, thereby enabling the bridging pieces to assume a correct normal position acting to sustain the ejecting rods 24 as they pass over the gap 30, unless a batch of dough 23 be delivered from the chute 6, in which case the ejecting rods 24 and bridge pieces 31 will be depressed causing the ejecting rods 24 to strike against an inclined wall 35 in the cavity 30 and be guided thereby to the inner concentric track or runway 27. The inner and outer positions of the ejecting rods 24 are shown in Figure 1.

The inner runway or track 27 is shown as provided at its lower end with a cam or curved terminal part 36 for guiding the ejecting rods 24 outwards in their radial slots 25 and to the outer track 26, by which movement the batch of dough 23 is expelled from its pocket and into one of the pans 37. These pans may be moved along a table 38 by automatic mechanism controlled by the ejecting rods 24. This mechanism is shown as including pusher arms 39 provided in any suitable number, preferably four. The pusher arms may be carried for rotation by a shaft 40 appropriately journaled in the framework of the machine. On this shaft 40 are shown one or more sprockets 41 driven by a chain or chains 42. These chains are shown in Figure 2 as connecting with sprockets 43 upon shafts 44 carried by the side plates 28 and 29 preferably externally thereof. Internally of the side plates 28 and 29 and upon shafts 44 are shown striker wheels 45 having a number of arms projecting into the path of those ejecting rods 24 which are traversing the inner track 27. These arms, however, are not affected by the ejecting rods 24 traveling about the outer track. The table 38 is provided with slots 38' to receive the pusher arms 39.

A holding belt 46 for preventing the escape of dough batches from the pockets is shown as extending about to one side of the drum and as being trained about a roller 47 mounted in appropriate bearings at the upper side portion of the framework. The lower bight of the belt 46 is shown as extending about a roller 48 fitted in the lower portion of the framework adjacent the pans 37. The position of this roller 48 will control the point of ejection of the dough batches. A belt adjusting mechanism is indicated at 49, whereby the slack of the belt may be taken up as desired.

In the use of the device, dough batches 23, formed in a moulding machine are delivered by way of the chute 6 to the drum. In case these dough batches weigh more than the prescribed amount they will over-balance the trap door 9 and be diverted to the return chute 16. The dough batches are delivered above the bridging piece 31 and the weight of the dough batch and its velocity will cause the flexible weight to be carried inwardly providing a pocket for the dough batch and incidentally the ejecting rod 24 will be forced inwardly, this movement being permitted by the radial slots 25 and the cavity 30. The bridging piece 31 will yield to permit this inner movement. The ejecting rod will thus be in position to traverse the inner track 27. In case no batch is delivered to a pocket, for instance, where a "double" is diverted to the return chute 16, the ejecting rod 24 of that empty pocket will be retained by the bridging piece 31 to the outer track 26 and will pass entirely around such outer track with the movement of the drum so as not to affect the pan moving mechanism. However, the ejecting rods upon the inner track will encounter the arms of the wheel 45 and the arrangement is such that the wheel will be shifted practically a quarter turn or through approximately 90 degrees. The movement will be communicated to the pusher arms 39 which will advance the next empty pan beneath the ejecting point of the drum which is just adjacent the belt roller 48. In this way the pans will be advanced only when a dough batch resides in one of the pans and the pans will be filled automatically leaving no empty pans to be filled by hand.

In Figures 3 and 4 there is shown a slight modification in which the wheel 45 having an arm is substituted by a wheel 45ª having radial notches or slots 50 to receive the ejecting pins 24. In advance of the wheel there is shown a depending arm 51 of a locking lever 52 having a dog 53 for engaging a notch. The lever is shown as fulcrumed at 54 to one of the stationary side plates. The method of operation is as follows:—

The ejecting pin coming down the inner track strikes first the arm 51, rocking the lever and withdrawing the dog 53 from the slot 50 in the wheel 45ª, the ejecting pin passing on to the mouth of the slot. The pin then carries the wheel around substantially a quarter turn and passes out through the cam 36 to the outside of the track where it remains unless depressed by a batch of dough at the receiving point.

It is obvious that various changes and modifications may be made in the details of construction and design of the above specifically described embodiment of this invention without departing from the spirit thereof.

What is claimed is:—

1. A pan filling mechanism comprising a rotary drum having depressible pockets for receiving dough batches, a pan advancing mechanism, and means adapted to be depressed with said pockets for actuating in depressed position only the pan advancing mechanism.

2. A pan filling mechanism comprising a rotary drum, a flexible web carried by the drum and adapted to be depressed inwardly to form pockets for dough batches, a pan advancing mechanism, and means carried by the drum and beneath said depressible pockets and positioned by the depression of said pockets to actuate the pan advancing mechanism.

3. A pan filling machine comprising a rotary drum, a flexible web of greater circumference than the drum mounted thereon and adapted to be depressed inwardly to form pockets for receiving dough batches, radially movable ejecting rods mounted on the drum within said pockets and adapted to be depressed by the entrance of a dough batch to a pocket, inner and outer tracks adjacent the drum for receiving said ejecting rods, and a pan advancing mechanism having an actuating part positioned for engagement by the ejecting rods traversing the inner track only.

4. A pan filling machine comprising a rotary drum, a flexible tape carried by the drum and adapted to be depressed inwardly to form pockets for receiving dough batches, radially movable ejecting rods back of said pockets, stationary inner and outer tracks adjacent the drum for receiving said ejecting rods, said tracks having at one point a means of communication, a yieldable bridging piece extending at the communicating point across the outer track, and a pan advancing mechanism having a part projecting into the path of the ejecting rods traversing the inner track.

5. A pan filling machine comprising a rotary drum, a flexible web fitted about the drum and adapted to be depressed to form pockets for receiving dough batches, a belt extending about one side of the drum to hold dough batches in their pockets, inner and outer concentric tracks adjacent said drum, said tracks communicating at the dough receiving end, a yieldable bridging piece extending across the unconnected end of the outer track, said inner track having a cam portion at its delivery end, pan advancing mechanism having an actuating part extending across said inner track, and ejecting rods mounted beneath said pockets and normally adapted to traverse the outer track, said rods adapted to be shifted to the inner track when the pockets are depressed by entrance of a dough batch, said rods adapted to actuate the pan advancing mechanism when in the inner track only.

6. In combination with a moulding machine, a chute leading therefrom, a rotary pocketed drum for receiving dough batches from the chute, pan advancing mechanism for moving the pans only when a pocket is presented having a batch of dough for delivery to a pan, and means associated with the chute for rejecting over-weight batches.

7. In combination with a moulding machine, a chute leading therefrom, a weighted trap door in said chute for rejecting doubles, a second diverting chute beneath said trap door, a rotary pocketed drum for receiving batches from said first mentioned chute, means for retaining batches in pockets of said drum, and a pan advancing mechanism actuated to advance a pan only upon the presentation of a filled pocket of the drum.

8. A pan filling machine comprising a rotary drum having pockets to receive dough batches, ejecting rods beneath the pockets, inner and outer tracks adjacent the drum for receiving said ejecting rods, a table for slidably holding a series of pans, pusher means for engaging said pans to advance the same along said table, and an actuating wheel for said pusher arms having portions extending in the path of the ejecting rods traversing said inner track and adapted to be moved by said rods.

9. A pan filling mechanism comprising continuously-moving dough receiving means having pockets, a normally stationary pan-advancing means, and means moved by the action of the dough batch in entering a pocket for moving the pan-advancing means one step.

10. A pan filling mechanism comprising a continuously-rotating drum having dough-batch-receiving pockets, means for receiving a pocketed pan and for advancing the pan step by step beneath the drum, and means rotating with the drum for actuating said last-named means.

In testimony whereof we affix our signatures.

JOSEPH WEBER.
LOUIS G. MORTEN.